No. 737,444. PATENTED AUG. 25, 1903.
E. T. MOORE.
FEED WATER HEATER.
APPLICATION FILED JUNE 3, 1903.
NO MODEL.
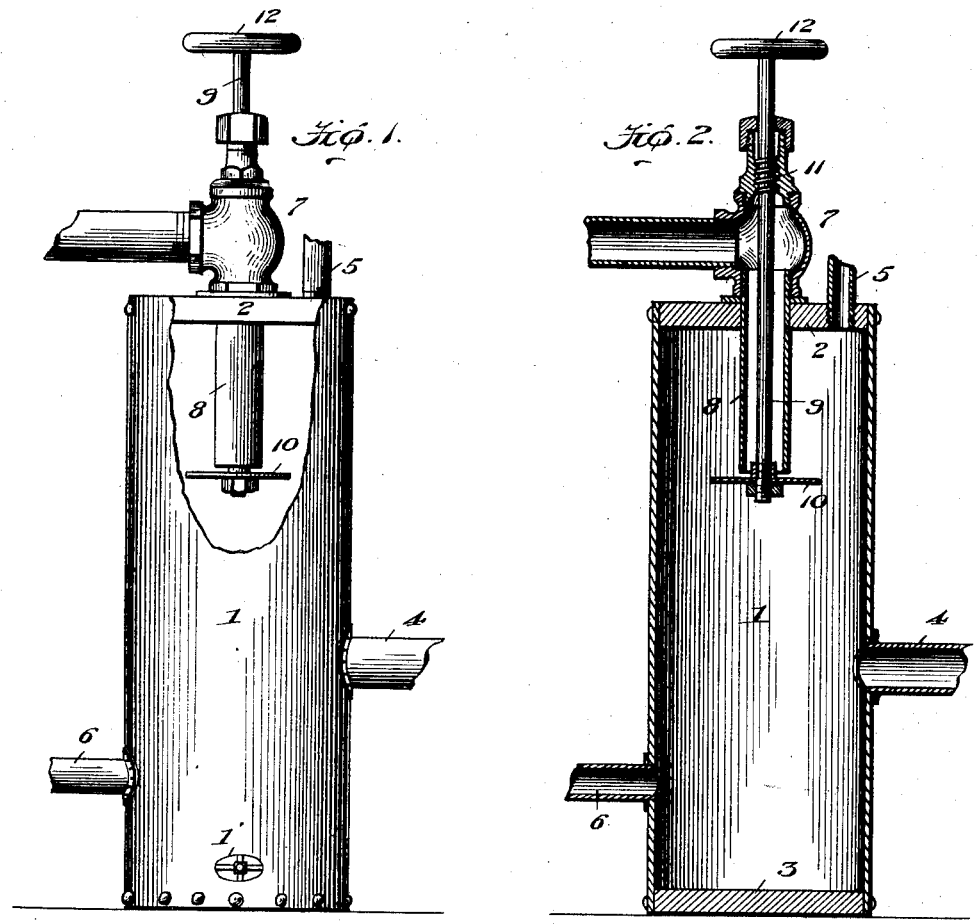

No. 737,444. Patented August 25, 1903.

UNITED STATES PATENT OFFICE.

ENOS T. MOORE, OF NEWCOMERSTOWN, OHIO, ASSIGNOR OF TWO-THIRDS TO JOHN S. BARNETT AND WILLIAM R. YINGLING, OF NEWCOMERSTOWN, OHIO.

FEED-WATER HEATER.

SPECIFICATION forming part of Letters Patent No. 737,444, dated August 25, 1903.

Application filed June 3, 1903. Serial No. 159,835. (No model.)

*To all whom it may concern:*

Be it known that I, ENOS T. MOORE, a citizen of the United States, residing at Newcomerstown, county of Tuscarawas, and State of Ohio, have invented certain new and useful Improvements in Feed-Water Heaters, of which the following is a specification.

This invention relates to feed-water heaters.

The object of the present invention is the provision of a simple and comparatively inexpensive feed-water heater adapted to utilize exhaust-steam to heat water and having an improved water-valve designed to regulate the flow of the water to be heated and to deliver it in a sheet or wafer to the action of the exhaust-steam in a novel manner, whereby a comparatively great water area is presented to the steam and it has the best possible access to the water, thereby insuring a very rapid heating of the water and the most perfect precipitation therefrom of the lime and other impurities.

The invention contemplates the provision of an improved feed-water heater of small size and convenient form and one which will permit easy cleansing.

For a complete disclosure of the invention reference is to be had to the following description and claims and to the accompanying drawings, in which—

Figure 1 is a side elevation, parts of the casing being broken away; Fig. 2, a vertical section, and Fig. 3 a cross-section on line $xx$ of Fig. 1.

The shell or casing 1 is by preference cylindrical and closed at top and bottom by the heads 2 and 3.

The numeral 4 is the pipe for admission of the exhaust-steam to the interior of the heater-shell 1, and 5 is the outlet for the exhaust-steam. The water-outlet, through which the heated feed-water passes to the steam-engine boiler, is shown at 6, said outlet being sufficiently above the bottom of the shell 1 so that the precipitated lime and other impurities will not pass out therethrough.

Disposed centrally of the head 2 is a valve shell or casing 7, through which the water to be heated is admitted. Depending from said valve-casing 7 is a tube or pipe 8, which extends into the interior of the shell 1 a suitable distance and is open at its lower end. Extending centrally of this tube is a valve-stem 9, carrying at its lower end a disk valve 10 of relatively large size and extending in a lateral direction and adapted to close against the lower end of the pipe or tube 8. The valve-stem 9 is provided with a coarse screw-thread 11, engaging a similar screw-thread on the bonnet of the valve-casing 7 and provided at its outer upper end with a hand-wheel 12 for turning the stem and opening the valve 10 more or less or closing it against the lower end of the tube 8. The water coming in through the valve-casing 7 flows down tube 8 and strikes against disk valve 10, which directs it in an unbroken wafer or sheet laterally in every direction against the sides of the shell or casing 1. The exhaust-steam entering through pipe 4 passes into the hollow center of the water-cylinder thus defined by the falling water and comes into direct contact with the relatively great area of water exposed to its action, insuring a rapid heating of the water from the direct action of the steam and from the heated casing 1, which is heated by the steam. The exhaust-steam fills the entire shell 1 and as it rises passes out through the exhaust-steam outlet 5. The amount of water-flow, thickness of the water-sheet, &c., are regulated by adjusting the disk valve 10 up and down relatively to the open lower end of the tube 8. The heated feed-water passes out through pipe 6.

Near the bottom of the heater-shell 1 I provide a hand-hole 1', through which the lime and other impurities precipitated from the water can be conveniently removed.

Having thus described my invention, what I claim as new, and desire to secure by Letters Patent, is—

1. In a feed-water heater, the combination with a shell or casing, a water-outlet, and steam inlet and outlet, of a water-supply valve comprising a tube or pipe having an open end or mouth adapted to discharge into the shell or casing, a valve movable toward and away from said open end and adapted for closing said open end, and means for adjusting said valve and maintaining it where adjusted to regulate the flow.

2. In a feed-water heater, the combination with a shell or casing, a water-outlet, and steam inlet and outlet, of a water-supply valve comprising a tube or pipe having an open end or mouth adapted to discharge into the shell or casing, a disk valve movable toward and away from said open end and adapted to close against said open end and means for adjusting said valve and maintaining it where adjusted to regulate the flow.

3. In a feed-water heater, the combination with a shell or casing, a water-outlet, and steam inlet and outlet, of a water-supply valve comprising a tube or pipe having an open end or mouth adapted to discharge into the shell or casing, a disk valve of considerably greater size than the discharge end of the pipe or tube and movable toward and away from said open end and adapted to close against said open end, and means for adjusting said valve and maintaining it where adjusted to regulate the flow.

4. In a feed-water heater, the combination with a shell or casing, of means for delivering steam through the side thereof and taking it off at a higher point, means for taking off the heated feed-water, means for feeding the water to the shell or casing, comprising a tube or pipe discharging into the casing substantially centrally from the sides thereof, and a disk valve controlling the flow through the discharge end or mouth of the tube or pipe and adapted to direct the water radially or laterally, and means for adjusting said valve and maintaining it where adjusted to regulate the flow.

5. In a feed-water heater, the combination with a shell or casing, a water-outlet, and steam inlet and outlet, of a water-supply valve comprising a tube or pipe having an open end or mouth from which the water is adapted to discharge into the shell or casing, and a valve movable toward and away from the open end or mouth and adapted for closing said open end, said valve and mouth being arranged for the unobstructed free lateral discharge of the water in an unbroken sheet in all directions.

6. In a feed-water heater, the combination with a shell or casing, a water-outlet, and steam inlet and outlet, of a water-supply valve comprising a tube or pipe having an open end or mouth from which water is adapted to discharge into the shell or casing, a valve movable toward and away from the open end or mouth and adapted for closing said open end, said valve and mouth being arranged for the unobstructed free lateral discharge of the water in an unbroken sheet in all directions, and means for adjusting said valve and maintaining it where adjusted, to regulate the flow.

In testimony whereof I hereunto affix my signature, in presence of two witnesses, this 21st day of May, 1903.

ENOS T. MOORE.

Witnesses:
  JOE LOADER, Jr.,
  T. J. RUSSELL.